United States Patent [19]

Wyhof

[11] 3,900,693

[45] Aug. 19, 1975

[54] DIELECTRIC RESINS

[75] Inventor: John R. Wyhof, Newark, Del.

[73] Assignee: ICI United States Inc., Wilmington, Del.

[22] Filed: Oct. 10, 1974

[21] Appl. No.: 513,890

Related U.S. Application Data

[62] Division of Ser. No. 362,540, May 21, 1973, Pat. No. 3,865,789.

[52] U.S. Cl. .............. 428/511; 428/530; 428/537; 427/121; 96/1.5; 96/1.8
[51] Int. Cl.² ...................... B05D 5/12; G03G 5/04
[58] Field of Search ......... 117/201, 161 K, 155 UA; 96/1.5, 1.8; 260/47 C, 47 UA, 49

[56] References Cited
UNITED STATES PATENTS

| | | | |
|---|---|---|---|
| 3,703,371 | 11/1972 | Merrill | 96/1.6 |
| 3,703,372 | 11/1972 | Merrill | 96/1.6 |

*Primary Examiner*—Michael F. Esposito

[57] ABSTRACT

Improved dielectric resins for use in electrographic and electrophotographic recording materials are disclosed. The resins are prepared by reacting a dicarboxylic acid with a polyol blend, said blend comprising a first polyol having the following general formula:

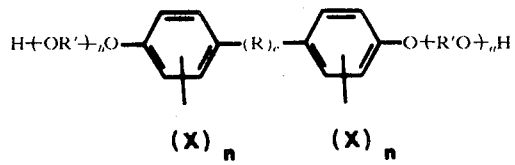

wherein
R is an alkylidene group containing from 1 to 4 carbon atoms, a cycloalkylidene group containing 5 or 6 carbon atoms, oxygen, sulfur, or a radical having one of the following formulas:

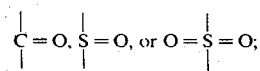

$c$ is 0 or 1;
X is halogen or an alkyl radical containing from 1 to 3 carbon atoms;
$n$ is an integer equal to from 0 to 4;
R' is an alkylene group containing from 2 to 4 carbon atoms or the radical $CH_2CHO$; and
$a$ and $b$ are integers each of which is equal to at least 1 and the sum of which is equal to about 2 and a second polyol having the following general formula:

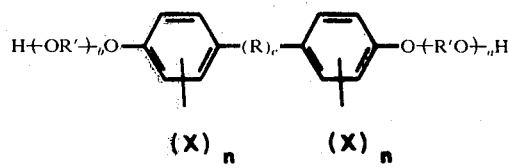

wherein R, c, X, R', and $n$ are as defined above and $a$ and $b$ are integers each of which is equal to at least 1 and the sum of which is equal to from about 4 to about 16.

Electrographic and electrophotographic recording elements prepared from these resins have improved charge acceptance and charge retention properties and significantly reduced curl, particularly at elevated humidity levels.

10 Claims, No Drawings

DIELECTRIC RESINS

This is a division of application Ser. No. 362,540, filed May 21, 1973, now U.S. Pat. No. 3,865,789.

BACKGROUND OF THE INVENTION

1. Field of the Invention

The present invention relates generally to dielectric resins. More particularly, the invention relates to dielectric resins useful in electrographic and electrophotographic recording elements.

2. Description of the Prior Art

Dielectric resins are known in the art. As used herein, the term dielectric resins refers to those materials which are insulators or non-conductors of electricity and will, therefore, accept and maintain an electric charge applied to them.

One use for dielectric resins is in recording elements useful in electrostatic imaging processes. As used herein, the term electrostatic is intended to refer to both electrographic and electrophotographic recording processes as hereinafter defined.

Electrographic recording elements are well known in the art. These recording elements generally comprise a base support having coated thereon a layer of dielectric material. Resins suitable for use in the dielectric layers are also known in the prior art. See, in this regard, U.S. Pat. No. 3,639,640 issued to Gager; U.S. Pat. No. 3,385,730 issued to Relph; U.S. Pat. No. 3,634,135 issued to Akiyama; and U.S. Pat. No. 3,653,894 issued to Levy et al.

The electrographic recording elements are useful in what is generally referred to as an electrographic printing process to provide a permanent record of the information generated by such a process. Although the details of the recording processes involved are not necessary to a complete understanding of the present invention which is related only to resins useful in electrographic elements which may be employed in such processes, a basic explanation of the process is useful in understanding the invention. Basically, electrostatic recording is accomplished by depositing a pattern of electrical charge upon the surface of the dielectric layer of the recording element, which charge pattern is made visible by bringing the element into contact with a suitable, usually powdered, electrically conductive ink or toner which adheres to the charged areas, and then, if desired, fixing the ink by subjecting the developed recording element to heat and/or pressure.

Electrographic printing processes are generally categorized in one of two ways. In the first or direct electrographic recording process, the information to be recorded is generated by way of an electrically energized stylus or an electrostatic writing tube, commonly referred to as a CRT pin tube, which is in close proximity to the electrographic recording element. Energization of the stylus or the electrostatic writing tube results in the deposition of a charge pattern on the surface of the electrographic recording element which charge pattern is commonly referred to as a "latent image." This charge pattern is then developed by any of the well-known electrostatic developing techniques to form a permanent and visible image or print. In the direct process, the charge pattern is developed or imaged directly upon the surface on which it is formed. Alternatively, in a transfer electrographic recording process, the charge pattern or latent image is originally formed on a surface other than the surface of the electrographic recording element, for example, on the surface of a photoconductive element, and the charge pattern is then transferred to the electrographic recording element in order to enable a permanent visible record to be made of the thus formed latent image. After transfer of the latent image to the electrographic recording element, development of the image is achieved in a manner similar to that employed in a direct process.

Electrophotographic recording elements are also known in the art. These recording elements comprise a base support having coated thereon a layer containing a dielectric resin and a photoconductive material — i.e., one which conducts an electrical charge only when exposed to light. The most commonly employed photoconductive material is zinc oxide.

In an electrophotographic recording process, an overall charge is applied to the surface of the recording element; the charged layer is then exposed to a light pattern causing the charge to be dissipated in the light struck areas and resulting in a charge pattern or latent image remaining on the surface of the recording element. This charge pattern is then developed to form a visible image by the use of a liquid or dry powder toner or ink which adheres to the charged areas and may be fixed thereto by the use of heat and/or pressure.

In either process, it is important that the dielectric resin-containing layer in the recording element be able to accept and retain a high level of charge. If the material either does not initially accept a high level of charge or if the accepted charge is substantially dissipated or lost before a visible image is formed, the recording element is of limited utility in commercial applications.

In both electrographic and electrophotographic recording elements, a problem limiting the utility of these processes is the tendency of the recording materials to curl. This property is undesirable both in the finished copy and during processing of the recording elements in the commercially available equipment. As is also well known in the art, this curl problem is most severe at elevated humidity.

It is an object of the present invention to provide dielectric resins useful in electrostatic and electrophotographic recording elements which accept a high level of charge — i.e., have a high charge acceptance —; which retain a high percentage of that charge for a period of time sufficient to allow light exposure and/or development of the charge pattern to form a visible image — i.e., have a high charge retention —; and which have a reduced tendency to curl.

SUMMARY OF THE INVENTION

In accordance with the present invention, electrographic and electrophotographic recording elements having reduced curl as well as high charge acceptance and charge retention properties are obtained if there is employed, as the dielectric resin in said material, a polyester resin prepared by reacting a dicarboxylic acid with a blend of polyols, said blend comprising a first polyol having the following general formula:

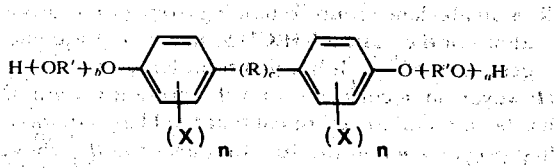

wherein

R is an alkylidene group containing from 1 to 4 carbon atoms, a cycloalkylidene group containing 5 or 6 carbon atoms, oxygen, sulfur, or a radical having one of the following formulas:

$$\overset{|}{\underset{|}{C}}=O, \overset{|}{\underset{|}{S}}=O; \text{ or } O=\overset{|}{\underset{|}{S}}=O;$$

$c$ is 0 or 1;

X is halogen or an alkyl radical containing from 1 to 3 carbon atoms;

$n$ is an integer equal to from 0 to 4;

R' is an alkylene group containing from 2 to 4 carbon atoms or the radical $CH_2CH\phi$; and $a$ and $b$ are integers each of which is equal to at least 1 and the sum of which is equal to about 2 and a second polyol having the following general formula:

$$H\!-\!(OR')_b\!O\!-\!\underset{(X)_n}{\bigcirc}\!-\!(R)_c\!-\!\underset{(X)_n}{\bigcirc}\!-\!O\!-\!(R'O)_a\!H$$

wherein R, $c$, X, R', and $n$ are as defined above and $a$ and $b$ are integers each of which is equal to at least 1 and the sum of which is equal to from about 4 to about 16.

DESCRIPTION OF THE PREFERRED EMBODIMENTS

As mentioned above, improved dielectric resins are prepared in accordance with the present invention. These resins comprise the reaction product of a dicarboxylic acid and a blend of polyols.

Each polyol in the blends useful in the preparation of the polyester resins of the present invention has the following general formula:

$$H\!-\!(OR')_b\!O\!-\!\underset{(X)_n}{\bigcirc}\!-\!(R)_c\!-\!\underset{(X)_n}{\bigcirc}\!-\!O\!-\!(R'O)_a\!H$$

wherein

R is an alkylidene group containing from 1 to 4 carbon atoms, a cycloalkylidene group containing 5 or 6 carbon atoms, oxygen, sulfur, or a radical having one of the following formulas:

$$\overset{|}{\underset{|}{C}}=O, \overset{|}{\underset{|}{S}}=O; \text{ or } O=\overset{|}{\underset{|}{S}}=O;$$

$c$ is 0 or 1;

X is halogen or an alkyl radical containing from 1 to 3 carbon atoms;

$n$ is an integer equal to from 0 to 4;

R' is an alkylene group containing from 2 to 4 carbon atoms or the radical $CH_2CH\phi$; and $a$ and $b$ are integers each of which is equal to at least one.

However, in accordance with the present invention, it has been found to be critical that the blend comprise a first polyol wherein the sum of $a$ and $b$ in the above formula is equal to about 2 and a second polyol, hereinafter referred to as the modifying polyol, in which the sum of $a$ and $b$ is equal to from about 4 to about 16.

It has also been found to be critical to first prepare the polyol blend and to react the resulting blend with the dicarboxylic acid. Satisfactory results are not achieved by preparing two polyester resins and, subsequently, combining the resins.

The amount of each polyol in the blend has not been found to be narrowly critical to the preparation of the dielectric resins. However, as is explained below, by controlling the type and amount of the second or modifying polyol in the blend, charge acceptance, charge retention, and curl properties may be optimized.

The polyols employed in the blends of the present invention are prepared by reacting an alkylene oxide, such as ethylene oxide or propylene oxide, or styrene oxide with a dihydric phenol having the following general formula:

$$HO\!-\!\underset{(X)_n}{\bigcirc}\!-\!(R)_c\!-\!\underset{(X)_n}{\bigcirc}\!-\!OH$$

wherein R, $c$, X and $n$ are as defined above. The sum of $a$ and $b$ in the previous formula is determined by the number of mols of alkylene oxide or styrene oxide added per mol of the dihydric phenol. Thus, in preparing the polyols useful in the blends, an average of from 2 mols of alkylene oxide or styrene oxide should be reacted with each mol of the dihydric phenol to prepare the first polyol and an average of from about 4 to about 16 mols of alkylene oxide or styrene oxide should be reacted with each mol of the dihydric phenol to prepare the second polyol.

The amount of each polyol in the blend employed in the preparation of the polyester resins depends upon the particular second or modifying polyol employed as well as the properties desired in the final product.

To achieve maximum curl properties, the following polyol blends are preferred:

If the modifying or second polyol is one in which the sum of $a$ and $b$ in the above formula is equal to about 6, at least about 20 mol percent of the polyol in said blend should be the modifying polyol.

If, however, the sum of $a$ plus $b$ in the modifying polyol is equal to about 9, at least about 10 mol percent of the modifying polyol should be employed.

Similarly, if the sum of $a$ plus $b$ is equal to about 16, at least about 5 mol percent should be employed.

Additional amounts of the above-mentioned polyols may be employed without adversely affecting the curl properties of the resulting product. However, as the amounts of modifying polyol are increased, the resistivity and dielectric properties of the coating decrease. Also, it has been found that, if too much modifying polyol is employed, the resulting dielectric layer is rather tacky and, therefore, undesirable for most commercial applications. The upper limit on any given polyol depends upon the sum of $a$ and $b$ in the above polyol. Generally, as this sum increases, the maximum amount of the polyol is decreased.

Preferred dielectric properties, including charge acceptance and charge retention, are achieved with resins having a resistivity, expressed as log $10\rho\epsilon$, equal to at least about 15. In this regard, resistivity is determined as follows:

The charged dielectric resin-containing coating is represented as a parallel circuit containing a resistance and capacitance. Using the Stati-Tester apparatus, the charge is placed on the dielectric layer by a corona and the voltage at any later time is determined from a time based chart recording of the Stati-Tester output. The rate of decay of the charge plate is given by the following expression:

$$\frac{-dQ}{dt} = \frac{Q}{RC}$$

where $Q$ is the charge on the surface of the dielectric layer and $R$ and $C$ are the resistance and capacitance, respectively. Since $Q = CV$, where $V$ is the potential across the layer, $$\frac{-1}{V}\frac{dV}{dt} = \frac{1}{RC}$$

where $t$ is the time. Integrating the above expression, $$\ln V = \ln V_o - \frac{t}{RC}$$

where t is the time interval between $V_0$, the initial voltage and V. Substituting $\rho\epsilon\epsilon_o$ for RC, $$\ln V = \ln V_o - \left[\frac{1}{\rho\epsilon\epsilon_o}\right] t$$

The values of V at the selected time intervals were plotted on semi-log paper as a function of the time interval. A straight line of best fit was then drawn through the data points. The slope of this line gave the value of $\rho\epsilon\epsilon$ where $v$ is the resistivity, $\epsilon$ is the dielectric constant and $\epsilon_o$ is a constant equal to $8.85 \times 10^{-14}$ farad/cm. From this, $\log_{10}\rho\epsilon$ was calculated.

In accordance with the present invention, resins having preferred resistivity values are prepared from the following preferred polyol blends:

Where the sum of $a$ plus $b$ in the modifying polyol is equal to about 6, up to about 40 or 45 mol percent of modifying polyol may be employed.

Where the sum of $a$ plus $b$ in the modifying polyol is equal to about 9, up to about 20 or 25 mol percent of modifying polyol may be employed.

Where the sum of $a$ plus $b$ in the modifying polyol is equal to about 16, up to about 6 or 7 mol percent of modifying polyol may be employed.

Thus, to achieve both reduced curl and optimum charge acceptance and charge retention properties, both of which are a function of the resistivity of the dielectric resin, it is preferred to employ polyol blends comprising:

a. from about 20 mol percent to about 40 or 45 mol percent of a modifying polyol wherein the sum of $a$ plus $b$ is equal to about 6, b. from about 10 mol percent to about 20 or 25 mol percent of a modifying polyol wherein the sum of $a$ plus $b$ is equal to about 9, or c. from about 5 mol percent to about 6 or 7 mol percent of a modifying polyol wherein the sum of $a$ plus $b$ is equal to about 16.

As will be appreciated by those skilled in the art, modifying polyols wherein the sum of $a$ plus $b$ is equal to greater than about 16 may also be employed in accordance with the present invention. However, as this sum is increased, the amount of modifying polyol employed must be reduced and will quite rapidly reach such a low level as to be particularly difficult to achieve on a commercial scale. Also, as this sum increases, the resins become more tacky resulting in undesirable properties in the dielectric layers. Also, where the sum of $a$ plus $b$ is equal to less than about 6, and particularly where it is equal to less than about 4, the amount of modifying polyol is so great as to result in a system which is undesirable for practical applications.

The polyester resins are prepared from the resulting polyol blend by reacting the polyol blend with an approximately equimolar amount of a dicarboxylic acid selected from the group consisting of alpha-unsaturated dicarboxylic acids and aromatic dicarboxylic acids. Representative alpha-unsaturated dicarboxylic acids which may be used to carry out this esterification reaction include, for example, maleic acid and fumaric acid. Representative aromatic dicarboxylic acids which may be employed include, for example, phthalic acid, isophthalic acid, and terephthalic acid. Anhydrides of these acids, such as maleic anhydride and phthalic anhydride, may also be employed. The acid employed in the esterification reaction may also contain a minor amount of a saturated acid, a second aromatic acid or another unsaturated aliphatic acid. If a mixture of acids is employed, it is preferred that at least about 80 mol percent of the acid be an alpha-unsaturated dicarboxylic acid or an aromatic dicarboxylic acid as described above. The preferred polyester resins for use in the present invention are those prepared from alpha-unsaturated dicarboxylic acid.

The reaction of the polyol and the dicarboxylic acid may be performed in an inert atmosphere and at moderate temperatures and substantially atmospheric pressures during the early stage, thus minimizing the loss of dicarboxylic acid by volatilization. As the reaction proceeds, the temperature may be increased and the pressure reduced. An esterification catalyst may be used, although it is generally preferred to carry out the reaction in the absence of excessive amounts of catalyst to avoid contamination of the final resinous product. Where an unsaturated dicarboxylic acid is used, it is usually desirable to include a small amount of a polymerization inhibitor such as hydroquinone or pyrogallol. The procedure employed to prepare the polyesters useful in this invention generally includes heating to about 200°C. for a period of time during the course of the reaction. The resulting polyesters generally have low acid numbers — i.e., up to about 30. As used herein, and as is well known to those skilled in the art, the acid number of the resin is determined by measuring the number of milligrams of potassium hydroxide required to neutralize one gram of resin. Also, as mentioned above, the ratio of carboxyl groups to hydroxyl groups in the reaction mixture employed in preparing the polyester resins of this invention is preferably about 1. However, ratios as low as about 0.8 and as high as about 1.2 can also be employed.

The preferred polyester resins employed in carrying out the present invention are prepared from blends of polyoxyalkylene bisphenol A fumarates such as polyoxypropylene bisphenol A fumarate containing an average of 2.2 oxypropylene groups per mol of the bisphenol A together with a polyoxypropylene bisphenol A fumarate containing an average of 9 oxypropylene groups per mol of the bisphenol A. As is well known in the art, bisphenol A refers to the following compound:

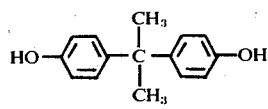

The base support used to prepare the electrographic or electrophotographic recording elements of the present invention may be any one of a number of base supports conventionally employed in the electrographic recording elements. Representative base supports which may be employed include, for example, metal foil, an electrically conductive paper, an electrically conductive film, and electrically conductive cloth. Of these, it is preferred to employ an electrically conductive paper.

When a base support other than a metal foil is employed, electrical conductivity can be imparted to the base by impregnating or coating the base with any of the compositions or materials which have previously been employed to impart electrical conductivity to such bases. Illustrative of such materials are materials such as carbon black; inorganic electrolytes such as sodium chloride, calcium chloride, and lithium chloride; and electrically conductive resinous polymers such as resinous polymers of quaternary ammonium salts and the like. Since materials such as carbon black impart a color to the base which might be considered to be objectionable and materials such as inorganic electrolytes are somewhat dependent on the ambient relative humidity for their effectiveness as conductive agents, the use of electrically conductive resinous polymers to impart electrical conductivity to the base supports is preferred. Examples of such polymers can be found, for example, in U.S. Pat. No. 3,011,918, which relates to homopolymers and copolymers of vinylbenzyl quaternary ammonium compounds and papers coated with such compounds. Other compounds which are useful for this purpose include, for example, polymers of vinyl pyridine quaternized with aliphatic esters, such as a polymer of vinyl pyridine which has been quaternized with diethyl sulfate.

The recording elements of the present invention are prepared by coating a layer comprising one of the above-described polyester resins on any of the above-mentioned base supports. This coating operation may be carried out by techniques which are well known in the art. Additives which are conventionally employed in the preparation of electrographic recording elements may also be included in the dielectric layer. These additives include, for example, whitening agents and toothing agents. If an electrophotographic recording element is desired, the dielectric resin layer also contains one or more photoconductors and, if desired, sensitizers for the photoconductor. Any of the inorganic or organic photoconductive materials known in the art may be employed.

In preparing the recording elements, the polyester resin and any additives are first dissolved in or dispersed in a suitable solvent, such as toluene, and the resulting slurry or solution is then coated onto a suitable base support and the material dried to remove the solvent. The amount of resin employed in the preparation of said elements may be varied over a wide range depending upon the desired properties and intended application of the electrographic recording element. However, for most applications, it has been found that an amount of resin which will result in a coating weight of from about 0.5 to about 10 pounds per ream (3,000 square feet) is preferred. Especially preferred results are achieved at coating weights equal to from about 1 to about 5 pounds per ream.

As compared to the previously available electrographic and electrophotographic recording elements, materials prepared in accordance with the present invention have been found to have improved charge acceptance and improved charge retention properties and a reduced tendency to curl particularly at relatively high humidity.

Charge acceptance is measured by recording the amount of voltage on the electrographic recording element immediately after exposure to a source such as a corona discharge.

Charge retention is measured by recording the amount of voltage remaining on the recording element after a predetermined period of time. This property is generally defined in terms of the percentage of initial charge retained after $x$ seconds or minutes.

Curl is measured by storing the papers at elevated humidity for a period of time equal to at least 24 hours and recording the amount of curl at the end of that time.

As mentioned above, in an electrographic or electrophotographic recording or printing process, it is important that the recording element accept and retain a high charge. In this regard, it should be noted that both the charge acceptance and charge retention are frequently related to the amount of dielectric or insulating resin employed in the layer of the recording element. Thus, in addition to having high charge acceptance and charge retention properties, it is desirable to achieve these properties at a relatively low coating weight as is possible with the resins which have been found to be useful for this purpose in accordance with the present invention.

In order to describe the present invention so that it may be more clearly understood, the following examples are set forth. These examples are set forth primarily for the purpose of illustration and any enumeration of detail contained therein should not be interpreted as a limitation on the concept of the present invention.

In the examples, the following standard tests were employed:

Charge acceptance was measured by a Most Stati-Tester available from M. K. Associates, Boston, Massachusetts, and is expressed in terms of volts.

Charge retention was also measured in the Most Stati-Tester and is also given in volts.

Coating weight was determined by weighing a sample of the electrographic recording element, subtracting the weight of the base support, and calculating the weight of the coating in pounds per ream.

Curl was measured by hanging the recording element in a high humidity environment — i.e., at 50% R.H. — for at least 24 hours and rating each in accordance with the following standards:

POOR — sheet completely rolled up
FAIR — about 2" to 3" curl on edges of sheet
GOOD — slight edge curl only
EXCELLENT — no curl Speed of electrophotographic recording elements was determined by determining the surface potential speed in accordance with the following equation:

$$\text{Surface potential speed} = \frac{LDR}{V_i I} = \frac{1}{2 t_h I}$$

where
LDR is the light decay rate,
$V_i$ is the initial surface potential,
$I$ is the light intensity, and $t_h$ is the time required to reach one-half the initial voltage.

Speed is expressed in terms of $(\text{ft. cd.-sec.})^{-1}$.

Also, in the examples, the following materials were employed:

Polyol A refers to polyoxypropylene (2.2)bis(4-hydroxy phenyl)propane. This polyol was prepared by reacting 2.2 mols of propylene oxide with 1 mol of bisphenol A.

Polyol B refers to polyoxypropylene(6)bis(4-hydroxy phenyl)propane.

Polyol C refers to polyoxypropylene(9)bis(4-hydroxy phenyl)propane.

Polyol D refers to polyoxypropylene(16)bis(4-hydroxy phenyl)propane.

Tecquinol refers to hydroquinone.

EXAMPLE 1

Into a 3-liter reaction flask equipped with a stirrer, reflux condenser, carbon dioxide inlet tube, thermometer, and heating mantle, there were added 1,338.8 grams of Polyol A and 579.5 grams of Polyol B. The resulting reaction mixture was heated to between 60°C. and 80°C. until the polyols were liquid. At this time, there were added 581.7 grams of fumaric acid and 1.25 grams of Tecquinol. Carbon dioxide gas was introduced continuously during the course of the reaction but was shut off during this addition. When the addition was completed, the temperature of the reaction mixture was increased to 210°C. and the reaction continued until the acid number was between 15 and 20. At this point, the reaction mixture was allowed to cool to room temperature.

The resulting resin was then cooled on Fletcher Tek conductive base paper at a coating weight of 5 pounds per ream. When evaluated, this product had the following properties:

| | |
|---|---|
| Resistivity | 16.1 |
| Charge acceptance | 545 volts |
| Charge retention after 1 min. | 95% |
| Charge retention after 6 mins. | 72% |
| Curl | Good |

EXAMPLE 2

Employing the procedure described in Example 1, the resins given in Table 1 were prepared.

TABLE 1

| Resin | Polyol A | Polyol B | Polyol C | Polyol D | Fumaric Acid |
|---|---|---|---|---|---|
| 2 | 1168.2 | 797.9 | — | — | 533.9 |
| 3 | 963.1 | 1023.3 | — | — | 513.6 |
| 4 | 1570.7 | — | 370.9 | — | 558.4 |
| 5 | 1427.4 | — | 535.3 | — | 537.3 |
| 6 | 1294.5 | — | 687.7 | — | 517.7 |
| 7 | 1667.1 | — | — | 271.5 | 561.5 |
| 8 | 1171.0 | — | 829.5 | — | 499.5 |
| 9 | 1574.0 | — | — | 374.0 | 553.0 |

EXAMPLE 3

Coatings were prepared, as described in Example 1, for several of the resins prepared in Example 2. The properties of the electrographic recording elements are given in the following table:

TABLE 2

| Resin | Resistivity ($\text{Log}_{10}\rho\epsilon$) | Charge Acceptance (volts) | Charge Retention after 1 min. | Charge Retention after 6 mins. | Curl |
|---|---|---|---|---|---|
| 2 | 16.0 | 400 | 94% | 67% | Excellent |
| 3 | 15.5 | 480 | 81% | 25% | Excellent |
| 4 | 16.3 | 520 | 97% | 81% | Good |
| 5 | 15.9 | 510 | 92% | 60% | Excellent |
| 6 | 15.6 | 455 | 84% | 36% | Excellent |
| 7 | 15.8 | 665 | 90% | 52% | Good |

EXAMPLE 4

Into a suitable reaction vessel, and while maintaining a nitrogen atmosphere, there was added 249 pounds of Polyol A, 72.2 pounds of Polyol C, and 78.8 pounds of maleic anhydride. The resulting blend was heated to 185°C. and maintained at that temperature for 1.5 hours. The reaction mixture was then heated to 220°C. and maintained at that temperature until a sample removed from the reaction mixture had an acid number of 30. Vacuum was then applied and heating continued until the acid number was between 15 and 16. At this time, there was added 1,825 grams of neo-pentyl glycol and 45.4 grams of Tequinol and the resulting mixture was stirred for one hour. The resulting resin was removed from the reaction vessel.

EXAMPLE 5

A coating composition was prepared comprising:

10 grams of the resin prepared in Example 4 dissolved in 10 grams of toluene;

80 grams of Photox 80, a zinc oxide available from New Jersey Zinc Co.;

0.8 gram of a dye solution; and 50 grams of toluene.

The dye solution employed was a 1% by weight solution in methanol of the following dyes in the following amounts:

27 grams of Bromophenol Blue 42 grams of Sodium Fluorescein 28 grams of Alizarine Cyanine Green 3 grams of Auramine O This composition was coated, by means of a wire-wound rod, onto Fletcher Tek Plus conductive base paper. The resulting electrophotographic recording elements have reduced curl when compared with sheets prepared from other polyester resins. The properties of the sheets were measured and are given in Table 3:

TABLE 3

| Coating Weight (pounds/ream) | Charge Acceptance (volts) | Speed (ft. cd./sec.)$^{-1}$ |
|---|---|---|
| 7.5 | 80 | 0.15 |
| 10.5 | 160 | 0.13 |
| 16.2 | 237 | 0.13 |
| 19.6 | 240 | 0.14 |

What is claimed is:

1. An electrographic recording element comprising a base support having coated thereon a layer of a dielectric resin said resin comprising the reaction product of
   a. a dicarboxylic acid or an anhydride thereof, provided that at least 80 mol percent of said acid or anhydride is an alpha unsaturated dicarboxylic acid, an anhydride thereof, an aromatic dicarboxylic acid or an anhydride thereof, and
   b. a polyol blend comprising a first polyol having the following formula:

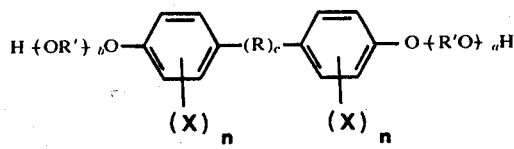

wherein
R is an alkylidene group containing from 1 to 4 carbon atoms, a cycloalkylidene group containing 5 or 6 carbon atoms, oxygen, sulfur, or a radical having one of the following formulas:

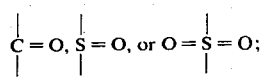

$c$ is 0 or 1;

X is halogen or an alkyl radical containing from 1 to 3 carbon atoms;

$n$ is an integer equal to from 0 to 4;

R' is an alkylene group containing from 2 to 4 carbon atoms or the radical $CH_2CH\phi$; and $a$ and $b$ are integers each of which is equal to at least 1 and the sum of which is equal to about 2, provided that the sum must be equal to at least 2.0 and a second polyol having the following general formula:

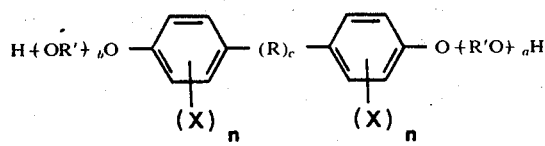

wherein R, $c$, X, R', and $n$ are as defined above and $a$ and $b$ are integers each of which is equal to at least 1 and the sum of which is equal to from about 4 to about 16, wherein the amount of acid or anhydride employed is sufficient to introduce from about 0.8 to about 1.2 carboxyl groups per hydroxyl group in the polyol blend.

2. An electrographic recording element, as claimed in claim 1, wherein said base support is a conductivized paper.

3. An electrographic recording element, as claimed in claim 1, wherein said dicarboxylic acid is fumaric acid, said first polyol is a polyoxypropylene bis-2,2' (4-hydroxyphenyl)propane containing an average of 2.2 oxypropylene groups per mol of bis-2,2' (4-hydroxyphenyl)propane and said second polyol is a polyoxypropylene bis-2,2' (4-hydroxyphenyl)propane containing an average of about 9 oxypropylene groups per mol of bis-2,2' (4-hydroxyphenyl)propane.

4. An electrographic recording element, as claimed in claim 1, wherein the sum of $a$ and $b$ in said second polyol is equal to about 6.

5. An electrographic recording element, as claimed in claim 4, wherein the amount of said second polyol in said blend is equal to from about 20 mol percent to about 45 mol percent of the total amount of polyols in said blend.

6. An electrographic recording element, as claimed in claim 1, wherein the sum of $a$ and $b$ in said second polyol is equal to about 9.

7. An electrographic recording element, as claimed in claim 6, wherein the amount of said second polyol in said blend is equal to from about 10 mol percent to about 25 mol percent of the total amount of polyols in said blend.

8. An electrographic recording element, as claimed in claim 1, wherein the sum of $a$ and $b$ in said second polyol is equal to about 16.

9. An electrographic recording element, as claimed in claim 8, wherein the amount of said second polyol in said blend is equal to from about 5 mol percent to about 7 mol percent based on the total amount of polyols in said blend.

10. An electrographic recording element, as claimed in claim 1, wherein the acid number of said resin is equal to up to about 30.

* * * * *

UNITED STATES PATENT AND TRADEMARK OFFICE
CERTIFICATE OF CORRECTION

PATENT NO. : 3,900,693
DATED : August 19, 1975
INVENTOR(S) : John R. Wyhof

It is certified that error appears in the above-identified patent and that said Letters Patent are hereby corrected as shown below:

Abstract, in the definition of R', "$CH_2CHO$" should read -- $CH_2CH\Phi$ --

Column 5, line 32, "$\rho\epsilon\epsilon$." should read -- $\rho\epsilon\epsilon_o$ --

Column 5, line 41, "$\rho\epsilon\epsilon$ where $\nu$" should read -- $\rho\epsilon\epsilon_o$ where $\rho$ --

Column 10, line 8, "cooled" should read -- coated --

Signed and Sealed this

Sixth Day of November 1979

[SEAL]

Attest:

RUTH C. MASON
Attesting Officer

LUTRELLE F. PARKER
Acting Commissioner of Patents and Trademarks